US012779881B2

(12) United States Patent
Tokonami et al.

(10) Patent No.: US 12,779,881 B2
(45) Date of Patent: Nov. 3, 2026

(54) SHEET DRYING APPARATUS AND IMAGE FORMING SYSTEM PROVIDED THEREWITH

(71) Applicant: KYOCERA Document Solutions Inc., Osaka (JP)

(72) Inventors: Minoru Tokonami, Osaka (JP); Mitsuhiro Goda, Osaka (JP); Masaki Murashima, Osaka (JP); Hiroyuki Ueda, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 153 days.

(21) Appl. No.: 19/018,665

(22) Filed: Jan. 13, 2025

(65) Prior Publication Data

US 2025/0229545 A1 Jul. 17, 2025

(30) Foreign Application Priority Data

Jan. 17, 2024 (JP) ................................ 2024-005595

(51) Int. Cl.
*B41J 11/00* (2006.01)

(52) U.S. Cl.
CPC ...... *B41J 11/00216* (2021.01); *B41J 11/0025* (2013.01); *B41J 11/0045* (2013.01); *B41J 11/007* (2013.01)

(58) Field of Classification Search
CPC .............. B41J 11/00216; B41J 11/0025; B41J 11/0045; B41J 11/007; B41J 11/0005; B41J 11/0095; B41J 29/377; B41J 11/0022; B41J 3/60; B65H 2301/517; B65H 2511/17; B65H 2553/412; B65H 2801/15; B65H 2220/03; F26B 3/283; F26B 15/18; F26B 25/009
See application file for complete search history.

(56) References Cited

U.S. PATENT DOCUMENTS

2018/0001665 A1* 1/2018 Isozaki ................ B41J 11/0022

FOREIGN PATENT DOCUMENTS

JP 2002-113910 A 4/2002

* cited by examiner

*Primary Examiner* — Lisa Solomon
(74) *Attorney, Agent, or Firm* — Stein IP, LLC

(57) ABSTRACT

A sheet drying apparatus includes a conveyance portion, a drying portion, and a sheet lift sensing mechanism. The conveyance portion has a conveyance member that moves while holding a sheet having an image formed on it with ink containing moisture. The drying portion is arranged opposite the conveyance member and heats and dries the sheet. The sheet lift sensing mechanism includes a sheet lift sensor having a light emitter and light receiver opposite each other in the width direction of the sheet horizontally orthogonal to the conveyance direction and a sensing assist member that protrudes from above into a conveyance space above the conveyance member and that contacts a lifted part of the sheet to rotate it in a horizontal direction. The distance from the conveyance member to the sensing assist member is smaller than the minimum height of the conveyance space.

6 Claims, 8 Drawing Sheets

SHEET DRYING APPARATUS AND IMAGE FORMING SYSTEM PROVIDED THEREWITH

INCORPORATION BY REFERENCE

This application is based on and claims the benefit of priority from Japanese Patent Application No. 2024-005595 filed on Jan. 17, 2024, the contents of which are hereby incorporated by reference.

BACKGROUND

The present disclosure relates to a sheet drying apparatus that dries sheets on which images have been printed in an inkjet recording apparatus or the like, and to an image forming system provided with such a sheet drying apparatus.

As recording apparatuses such as facsimile machines, copiers, and printers, inkjet recording apparatuses, which form images by ejecting ink onto a sheet, are widely used. Sheet drying apparatuses are known for heating and drying sheets (paper) on which ink has been adhered by inkjet recording apparatuses.

In a sheet drying apparatus, the ink that has adhered to a sheet conveyed by a conveyance belt needs to be dried quickly. This makes it difficult to sense the presence or absence of a sheet that is conveyed in a state sucked onto the conveyance belt, which becomes hot.

SUMMARY

According to one aspect of the present disclosure, a sheet drying apparatus includes a conveyance portion, a drying portion, and a sheet lift sensing mechanism. The conveyance portion has a conveyance member that moves while holding a sheet having an image formed on it with ink containing moisture. The drying portion is arranged opposite the conveyance portion, and heats and dries the sheet. The sheet lift sensing mechanism is arranged downstream of the drying portion with respect to the conveyance direction of the sheet, and senses a lift of the sheet from the conveyance member. The sheet lift sensing mechanism includes: a sheet lift sensor having a light emitter and a light receiver arranged opposite each other in the width direction of the sheet that is horizontally orthogonal to the conveyance direction; and a sensing assist member that protrudes from above into a conveyance space above the conveyance member, and contacts a lifted part of the sheet to rotate the sheet in a horizontal direction. The distance from the conveyance member to the sensing assist member is smaller than the minimum height of the conveyance space.

DETAILED DESCRIPTION

Figure 1:
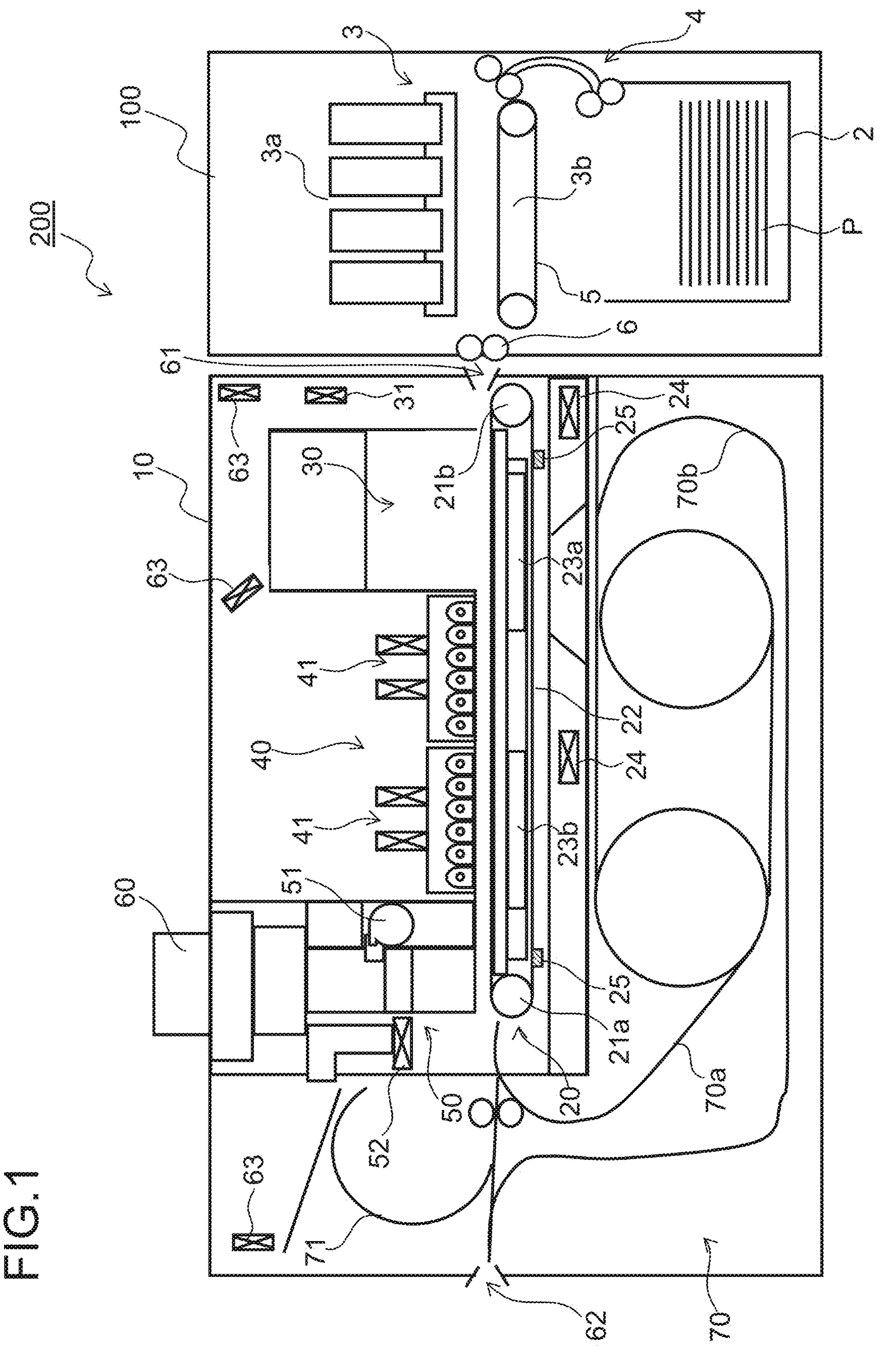
FIG. 1 is a schematic diagram showing the internal construction of an image forming system provided with a sheet drying apparatus according to the present disclosure.
Figure 2:
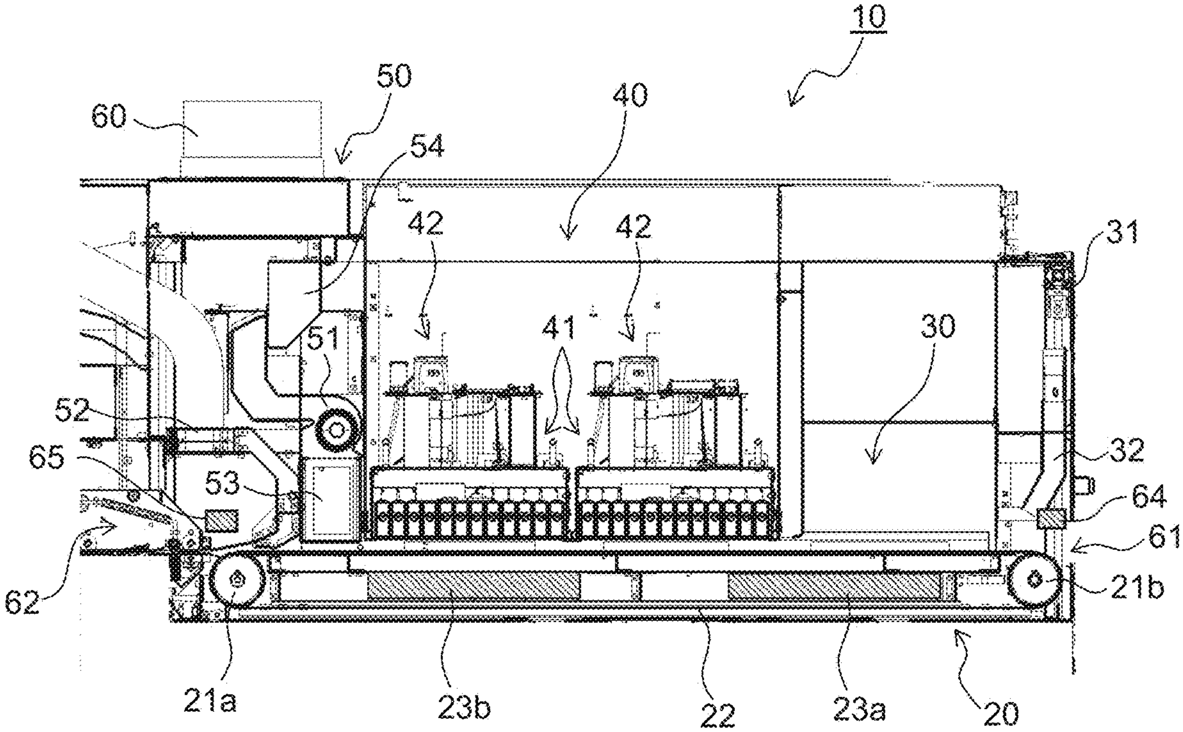
FIG. 2 is a side sectional view around a drying portion in a sheet drying apparatus according to one embodiment of the present disclosure.

1. Construction of an Image Forming System Including a Sheet Drying Apparatus: An embodiment of the present disclosure will be described below with reference to the accompanying drawings. FIG. 1 is a schematic diagram showing the internal construction of an image forming system 200 including a sheet drying apparatus 10 of the present disclosure. FIG. 2 is a side sectional view around a drying portion 40 in the sheet drying apparatus 10 according to one embodiment of the present disclosure. The image forming system 200 configured with an image forming apparatus 100 and the sheet drying apparatus 10 will be described with reference to FIGS. 1 and 2.

The image forming apparatus 100 is an inkjet recording printer and includes a sheet storage portion 2 arranged in a bottom part of the image forming apparatus 100, an image forming portion 3 arranged above the sheet storage portion 2, and a sheet feed portion 4 that feeds a sheet P stored in the sheet storage portion 2 to the image forming portion 3.

The image forming portion 3 is configured with a recording portion 3a having a plurality of recording heads and a print conveyance portion 3b arranged opposite the recording portion 3a. The print conveyance portion 3b includes an endless print conveyance belt 5 stretched around a plurality of rollers including a driving roller. The sheet P conveyed by the sheet feed portion 4 is conveyed below the recording portion 3a by being held under suction on the print conveyance belt 5 by a sheet suction portion (not shown) arranged inward of the print conveyance belt 5. The sheet P having a predetermined image recorded to it by the image forming portion 3 is discharged through a pair of discharge rollers 6 and is conveyed into the sheet drying apparatus 10.

The sheet drying apparatus 10 is arranged adjacent to the image forming apparatus 100 and dries the ink on the sheet P discharged from the image forming apparatus 100. The sheet drying apparatus 10 includes a first conveyance portion 20, a preliminary drying portion 30, a drying portion 40, a suction fan unit 50, and a second conveyance portion 70.

The first conveyance portion 20 includes a driving roller 21a, a driven roller 21b, and a conveyance belt 22. The conveyance belt 22 is stretched around the driving roller 21a arranged on the downstream side and the driven roller 21b arranged on the upstream side with respect to the conveyance direction of the sheet P (right to left direction in FIG. 1; hereinafter, referred to simply as the conveyance direction).

Inward of the conveyance belt 22 is arranged sheet suction portions 23a and 23b. In the conveyance belt 22, many suction holes (not shown) are formed through which to pass suction air for sucking the sheet P onto the conveyance belt 22 by negative pressure suction by the sheet suction portions 23*a* and 23*b*.

Belt cooling fans 24 are arranged at two places below the conveyance belt 22. A belt temperature sensor 25 is arranged adjacent to a bottom face of the conveyance belt 22. The belt cooling fan 24 blows cooling air to the conveyance belt 22 when the sensed temperature of the belt temperature sensor 25 reaches or exceeds a predetermined temperature.

The preliminary drying portion 30 is arranged closely downstream of a sheet loading port 61 with respect to the conveyance direction and preliminarily dries the ink on the sheet P conveyed in through the sheet loading port 61. The preliminary drying portion 30 includes a sheet blowing fan 31 and a sheet blowing duct 32 for blowing air from above the sheet P.

The drying portion 40 is arranged adjacently downstream of the preliminary drying portion 30 with respect to the conveyance direction and dries the ink on the sheet P having passed through the preliminary drying portion 30. The drying portion 40 includes two heating units 41 arranged so as to face a top surface of the conveyance belt 22.

The suction fan unit 50 sucks in the water vapor emanating from the sheet P passing through the drying portion 40. The suction fan unit 50 includes a suction fan 51 that sucks in air containing water vapor inside the drying portion 40 and a separation fan 52 that blows separation air for separating the sheet P from the conveyance belt 22. The suction fan unit 50 communicates with a space between the conveyance belt 22 and the heating unit 41 via a first duct 53 and communicates with an exhausting port 60 formed in a top part of the sheet drying apparatus 10 via a second duct 54.

A plurality of ambient air intake fans 63 for taking in ambient air into the sheet drying apparatus 10 are arranged at appropriate places in the sheet drying apparatus 10. In an upstream and a downstream part of the first conveyance portion 20 are arranged sheet detection sensors 64 and 65 respectively. The sheet detection sensors 64 and 65 detect the sheet P having passed through the sheet loading port 61 and the sheet discharge port 62.

As, by being driven to rotate by the driving roller 21*a*, the conveyance belt 22 rotates in the counterclockwise direction, the sheet P conveyed in through the sheet loading port 61 passes through the preliminary drying portion 30, then through the drying portion 40, and then through the suction fan unit 50 to be discharged through the sheet discharge port 62 out of the sheet drying apparatus 10 or conveyed into the second conveyance portion 70.

The second conveyance portion 70 is arranged below the drying portion 40 and the preliminary drying portion 30 across the first conveyance portion 20. The second conveyance portion 70 includes a reversing conveyance passage 70*a*, for reversing top side down the sheet P on which the ink has been dried, and a duplex conveyance passage 70*b*, for returning, when duplex printing is performed on the sheet P, the sheet P reversed top side down to the image forming apparatus 100.

Downstream (left side in FIG. 1) of the suction fan unit 50 with respect to the conveyance direction is provided a retraction path 71 in the shape of an arc. The retraction path 71 is where a sheet P (waste sheet) that has become useless due to a printing defect or the like in the image forming apparatus 100 is retracted and stored.

Figure 3:
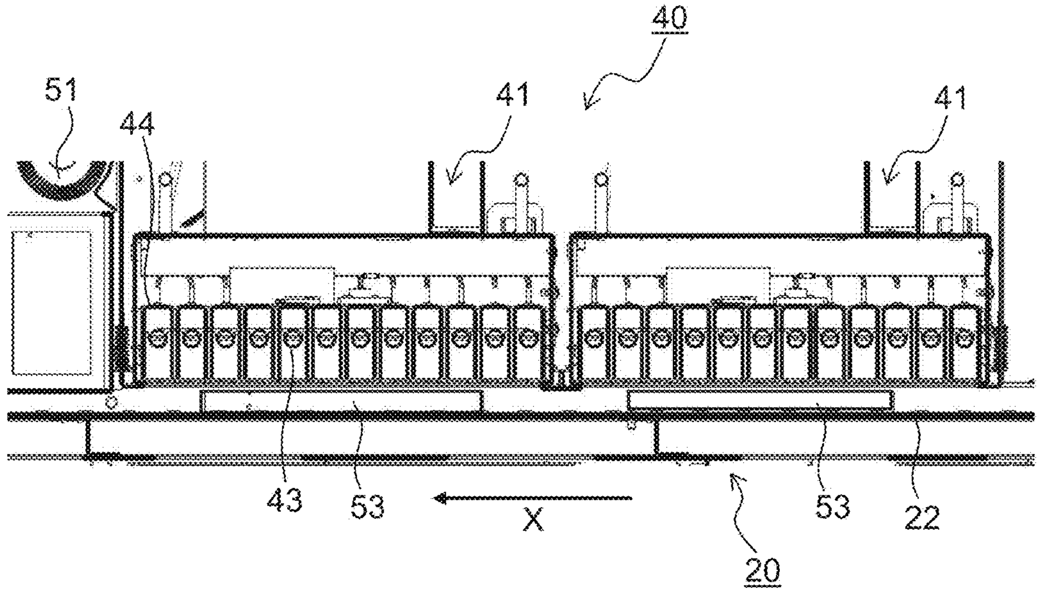
FIG. 3 is an enlarged view of the drying portion in FIG. 2.

2. Construction of the Sheet Drying Apparatus: FIG. 3 is an enlarged view of the drying portion 40 in FIG. 2. The drying portion 40 includes a heating unit 41 and a hot air fan 42 (see FIG. 2). Two heating units 41 are arranged along the conveyance direction (arrow-X direction). The heating unit 41 includes a heater 43 and a reflector 44.

The heater 43 is in the shape of a bar extending in the sheet width direction (the direction orthogonal to the plane in FIG. 3; hereinafter, referred to simply as the width direction) horizontally orthogonal to the conveyance direction. In the heating unit 41, a plurality (12 in this embodiment) of heaters 43 are arranged side by side along the conveyance direction. In this embodiment, an infrared heater is used as the heater 43.

The reflector 44 is a reflector plate U-shaped as seen in a side view arranged so as to surround the heater 43 from above. The infrared rays emitted from the heater 43 are reflected downward by the inner surface of the reflector 44 and are shone onto the sheet P carried and conveyed on the conveyance belt 22. Thus, the moisture in the ink on the sheet P evaporates and the ink dries; thus, the ink is fixed to the sheet P.

The hot air fan 42 is arranged above the heating unit 41. More specifically, the hot air fan 42 is arranged so as to blow air from above toward the reflectors 44. The air blown from the hot air fan 42 onto the reflectors 44 is heated as it passes through the gaps between the reflectors 44 and becomes hot air to flow into the gap (drying space) between the heating unit 41 and the conveyance belt 22.

If steam or water vapor is present in the gap between the heating unit 41 and the conveyance belt 22, the infrared rays emitted from the heater 43 and reflected from the reflector 44 are absorbed by the steam or water vapor and this impairs their ability to dry the ink on the sheet P. Thus, by operating the hot air fan 42 to blow hot air into the gap between the heating unit 41 and the conveyance belt 22 and scattering and removing the steam or water vapor emanating from the sheet P, it is possible to maintain the drying properties of the ink under infrared rays.

Between the drying portion 40 and the suction fan unit 50, a first duct 53 is provided for sucking the steam or water vapor emanating from the sheet P together with air. The first duct 53 extends from the gap between the heating unit 41 and the conveyance belt 22 to the suction fan 51 in the suction fan unit 50.

Figure 4:
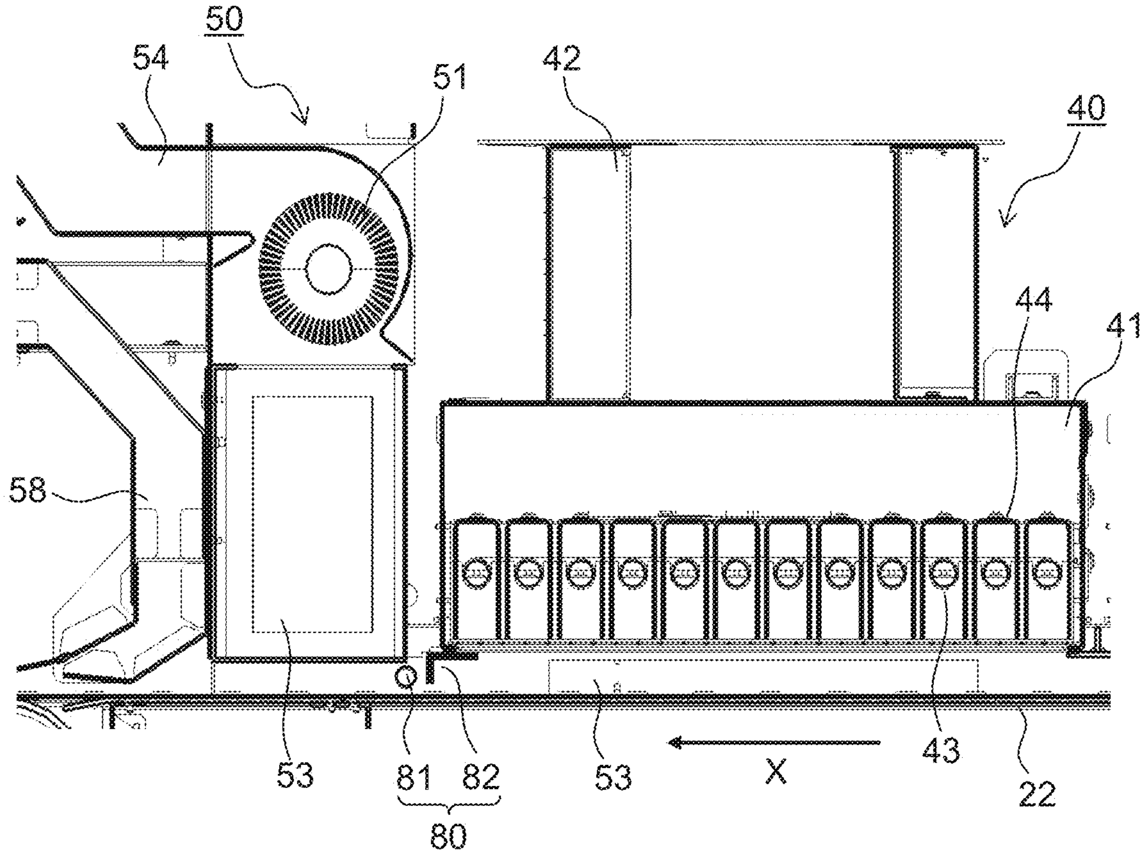
FIG. 4 is a side sectional view around the boundary between the sheet drying portion and a suction fan unit in the sheet drying apparatus.
Figure 5:
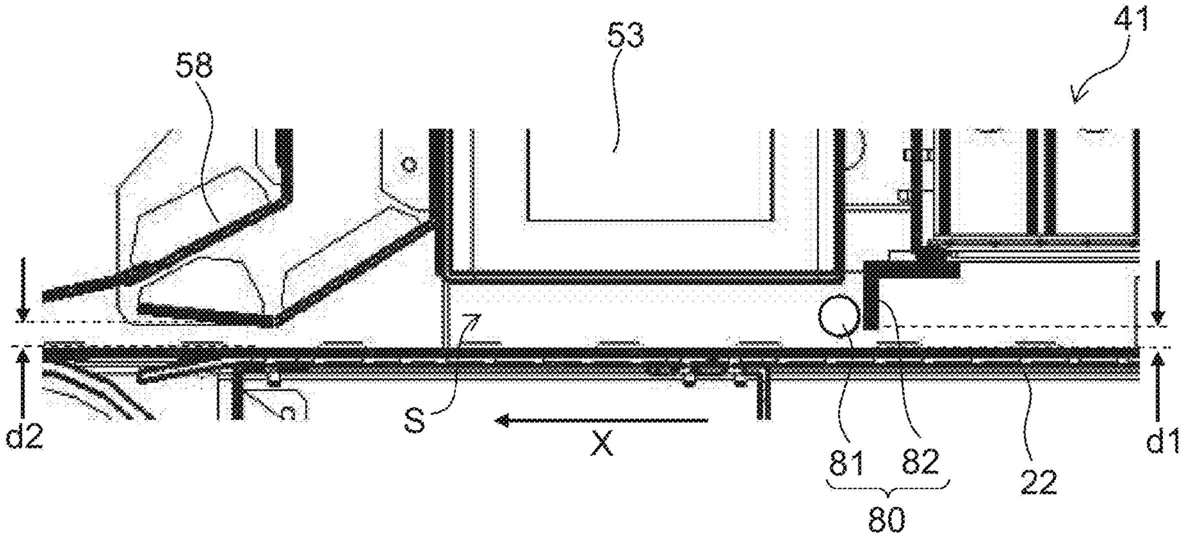
FIG. 5 is an enlarged view around a sheet lift sensing mechanism in FIG. 4.
Figure 6:
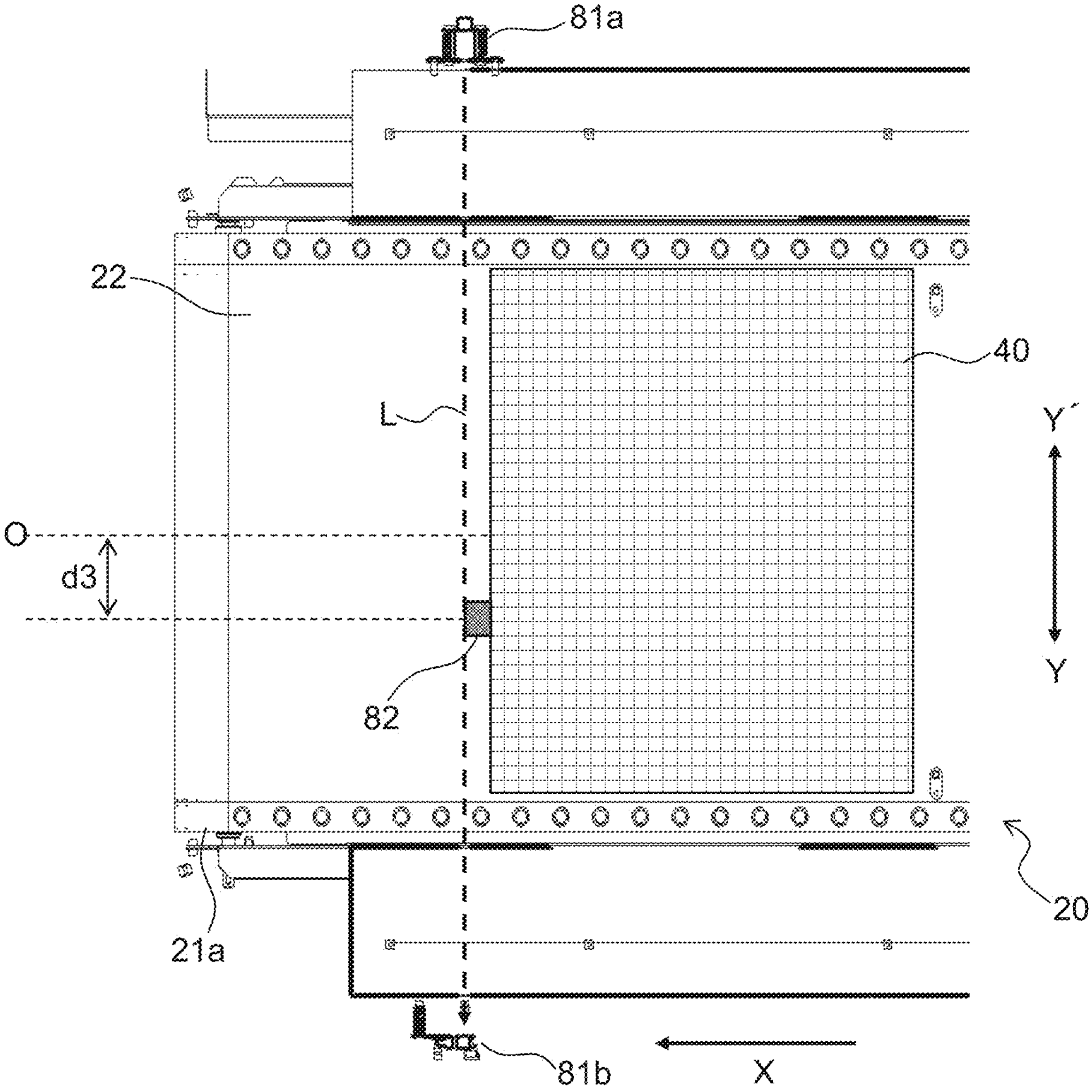
FIG. 6 is a plan view around the sheet lift sensing mechanism in a first conveyance portion as seen from above.

3. Construction of a Sheet Lift Sensing Mechanism: FIG. 4 is a side sectional view around the boundary between the drying portion 40 and the suction fan unit 50 in the sheet drying apparatus 10. FIG. 5 is an enlarged view around a sheet lift sensing mechanism 80 in FIG. 4. FIG. 6 is a plan view around the sheet lift sensing mechanism 80 in the first conveyance portion 20 as seen from above.

As shown in FIGS. 4 and 5, near the boundary between the drying portion 40 and the suction fan unit 50, a sheet lift sensing mechanism 80 is arranged that senses a lift of the sheet P conveyed by the conveyance belt 22 in the first conveyance portion 20. The sheet lift sensing mechanism 80 has a sheet lift sensor 81 and a sensing assist member 82.

As shown in FIG. 6, the sheet lift sensor 81 is an optical sensor having a light emitter 81*a* and a light receiver 81*b*. The light emitter 81*a* and the light receiver 81*b* are arranged opposite each other across the conveyance belt 22 along the width direction (arrows-YY' direction) that is horizontally orthogonal to the conveyance direction (arrow-X direction). The sheet lift sensor 81 senses a lift of the sheet P from the conveyance belt 22 when the sheet P blocks the optical path L along which the light emitted from the light emitter 81*a* strikes the light receiver 81*b*.

As shown in FIG. 5, the sensing assist member 82 is a member L-shaped as seen in a side view that is fitted to a downstream end part of the heating unit 41 with respect to the conveyance direction. The sensing assist member 82 is arranged closely upstream of the optical path L of the sheet lift sensor 81 with respect to the conveyance direction. The distance d1 between the sensing assist member 82 and the conveyance belt 22 (conveyance surface) is smaller than the distance d2 between a separation guide 58 and the conveyance belt 22, which distance is the minimum height of the conveyance space S above the conveyance belt 22.

As shown in FIG. 6, the sensing assist member 82 is arranged at a position displaced by a predetermined distance d3 to one side (arrow-Y direction) in the width direction from the width-direction center line O of the sheet P conveyed by the conveyance belt 22.

Figure 7:
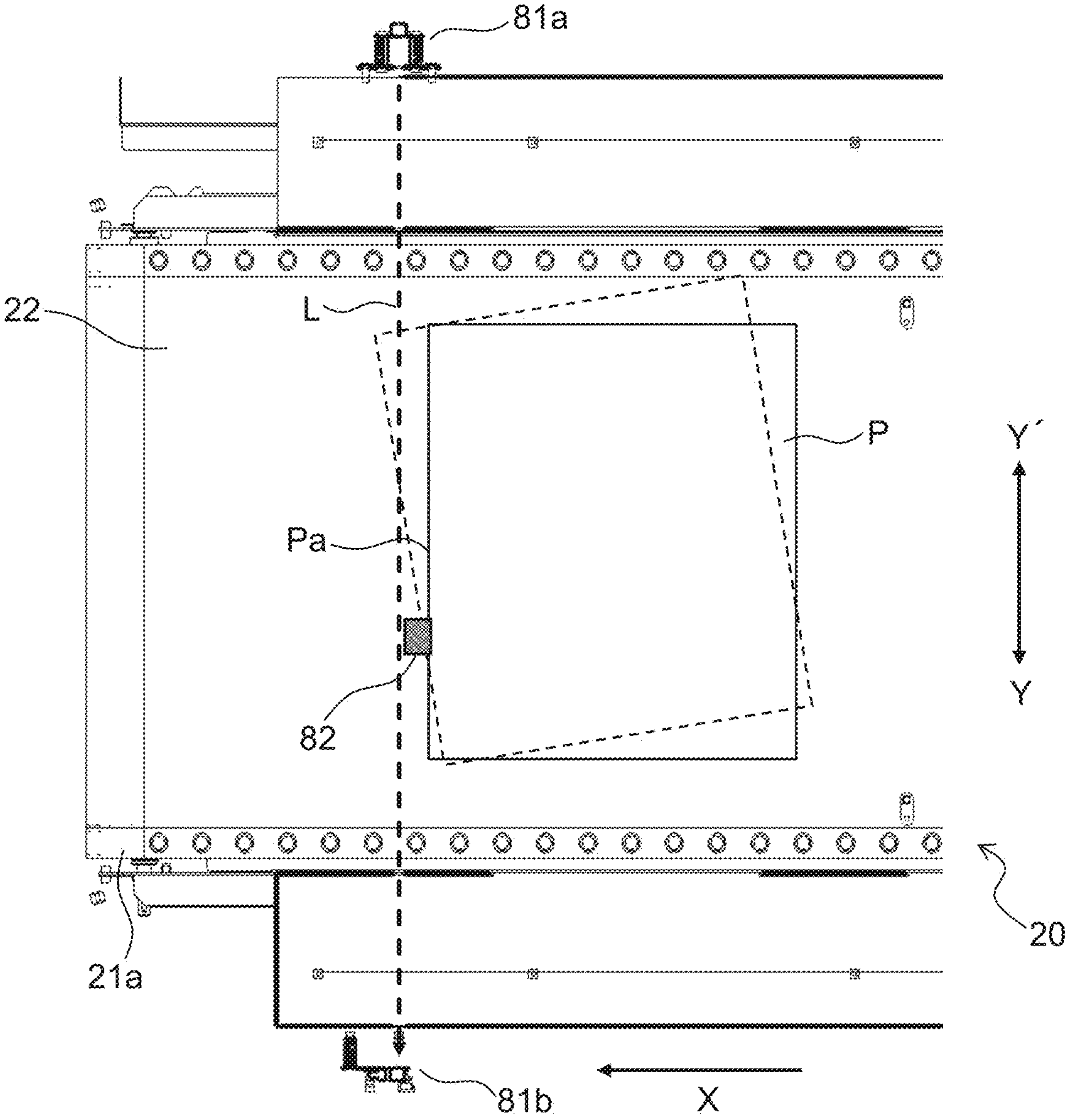
FIG. 7 is a plan view showing a state where the sheet lift sensing mechanism has sensed a lift of a sheet.
Figure 8:
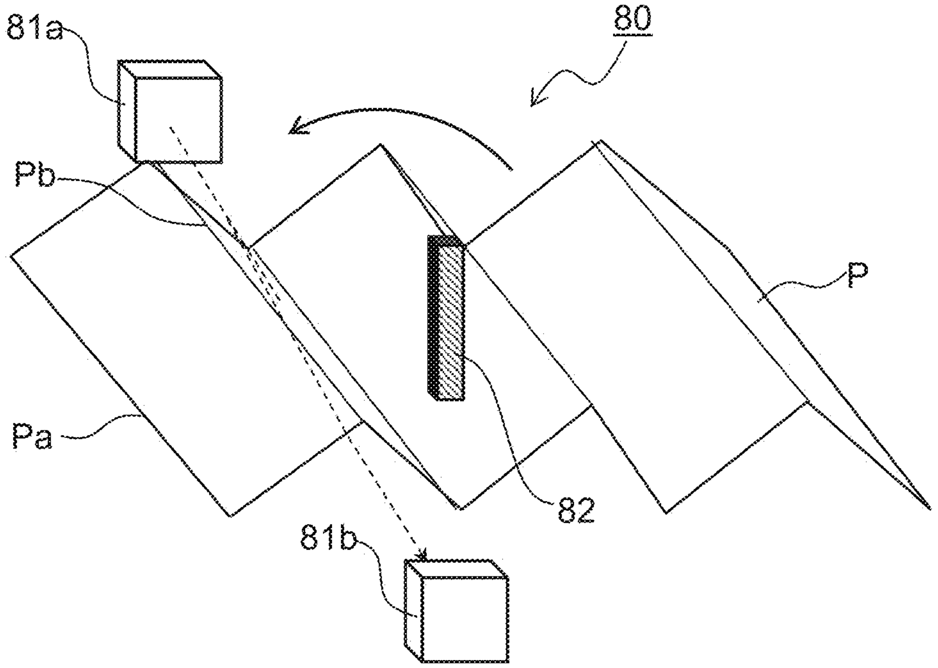
FIG. 8 is a schematic diagram showing the mechanism by which the sheet lift sensing mechanism senses a lift of a sheet.

FIG. 7 is a plan view showing a state where the sheet lift sensing mechanism 80 has sensed a lift of the sheet P. FIG. 8 is a schematic diagram showing the mechanism by which the sheet lift sensing mechanism 80 senses a lift of the sheet P. If the sheet P is conveyed with a predetermined lift (equal to or larger than the distance d1) from the conveyance belt 22, then as shown in FIG. 7 the downstream edge Pa of the sheet P in the conveyance direction collides with the sensing assist member 82.

The sensing assist member 82 is arranged at a position disposed from the width-direction center of the sheet P and thus, as indicated by broken lines in FIG. 7, the sheet P that has collided with the sensing assist member 82 rotates such that its edge Pa in the direction (arrow-Y' direction) opposite from the direction (arrow-Y direction) of the displacement of the sensing assist member 82 protrudes downstream.

When the sheet P is lifted from the conveyance belt 22, if the lifted part (bent part) of the sheet P passes so as to cross over the optical path L between the light emitter 81*a* and the light receiver 81*b*, the lift of the sheet P may fail to be sensed.

In the sheet lift sensing mechanism 80 of the embodiment, the sensing assist member 82 rotates the sheet P so that, as shown in FIG. 8, the bent part Pb of the sheet P blocks the optical path L between the light emitter 81*a* and the light receiver 81*b*. This makes it possible to reliably sense a lift of the sheet P with the sheet lift sensor 81.

Figure 9:
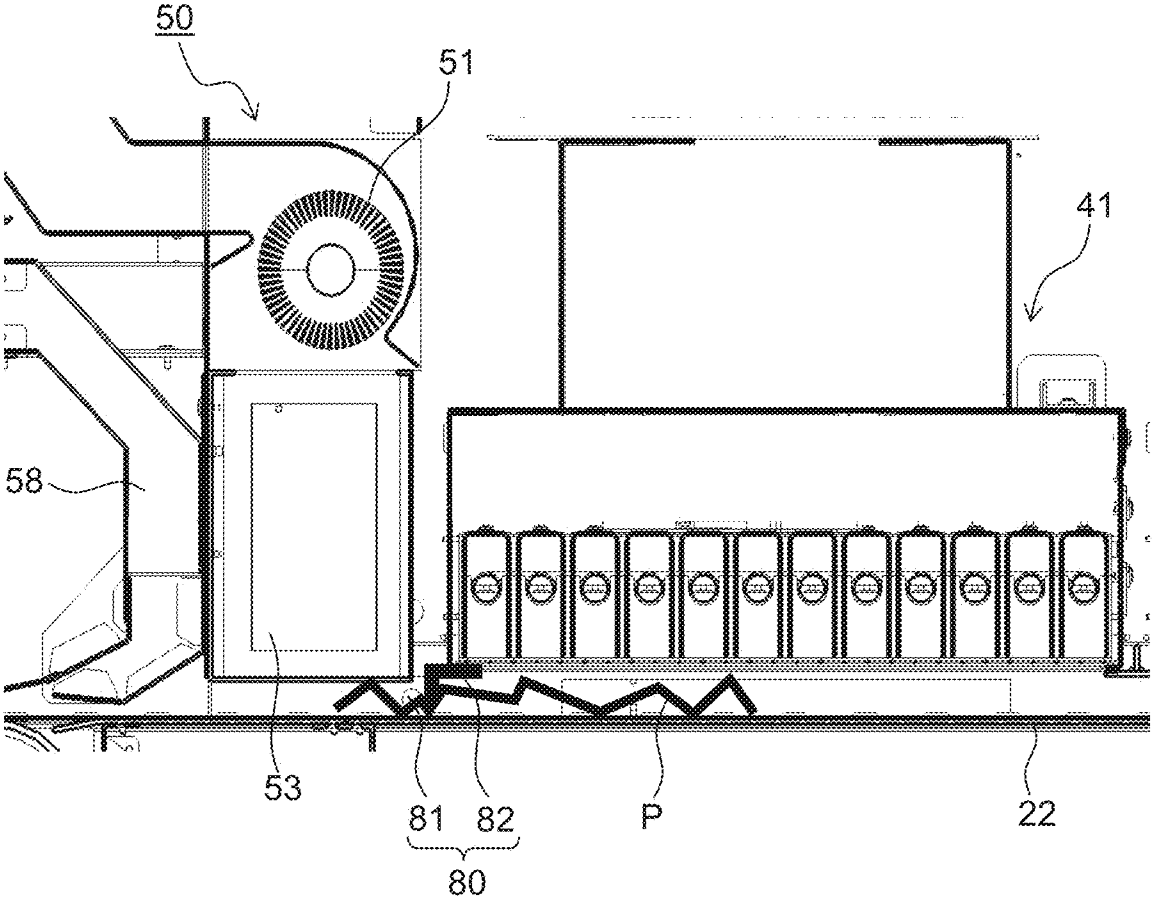
FIG. 9 is a side sectional view showing a state where a sheet has jammed around the sheet lift sensing mechanism.

FIG. 9 is a side sectional view showing a state where the sheet P has jammed around the sheet lift sensing mechanism 80. If the sheet P jams (paper is stuck) around the drying portion 40, a user waits for the drying portion 40 to cool to or below a predetermined temperature and then opens the exterior and inner covers (neither is shown) of the sheet drying apparatus 10.

Figure 10:
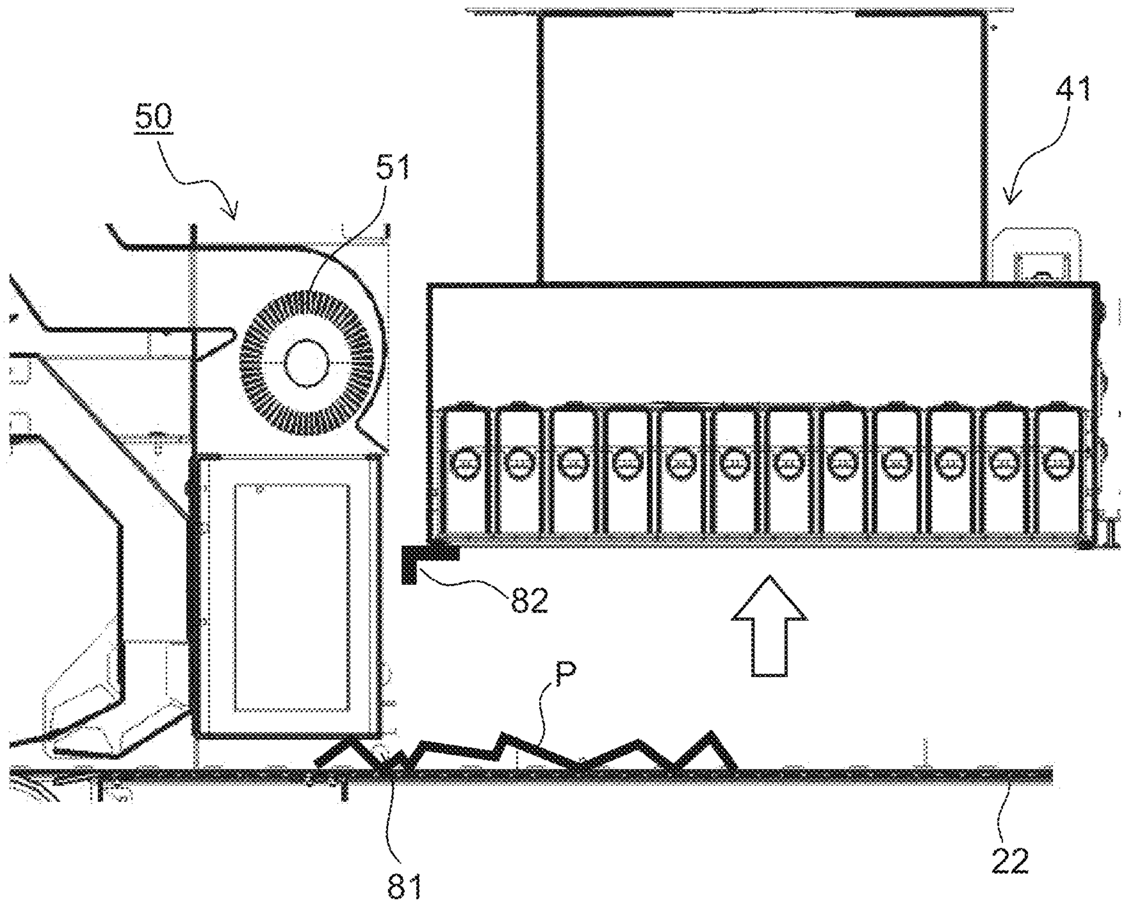
FIG. 10 is a side sectional view showing a state where a heating unit has moved up from the state in FIG. 9.

Then, as shown in FIG. 10, the user raises the heating unit 41 and removes the jammed sheet P. Here, the sensing assist member 82 fitted to the heating unit 41 is raised together with the heating unit 41 and thus the sensing assist member 82 does not hamper jam removal.

With the configuration of the embodiment, the sensing assist member 82 is arranged closely upstream of the sheet lift sensor 81 with respect to the conveyance direction so that it can bring the lifted part of the sheet P into contact with the sensing assist member 82 and thereby rotate the sheet P. It is thus possible to reliably block the optical path of the sheet lift sensor 81 and to accurately sense a lift of the sheet P.

Moreover, arranging the sensing assist member 82 at a position displaced from the width-direction center line O of the sheet P reliably permits the sheet P in contact with the sensing assist member 82 to rotate. Furthermore, fitting the sensing assist member 82 to the heating unit 41, which is movable up and down, permits easy removal of a jammed sheet P with the sensing assist member 82 raised together with the heating unit 41.

Figure 11:
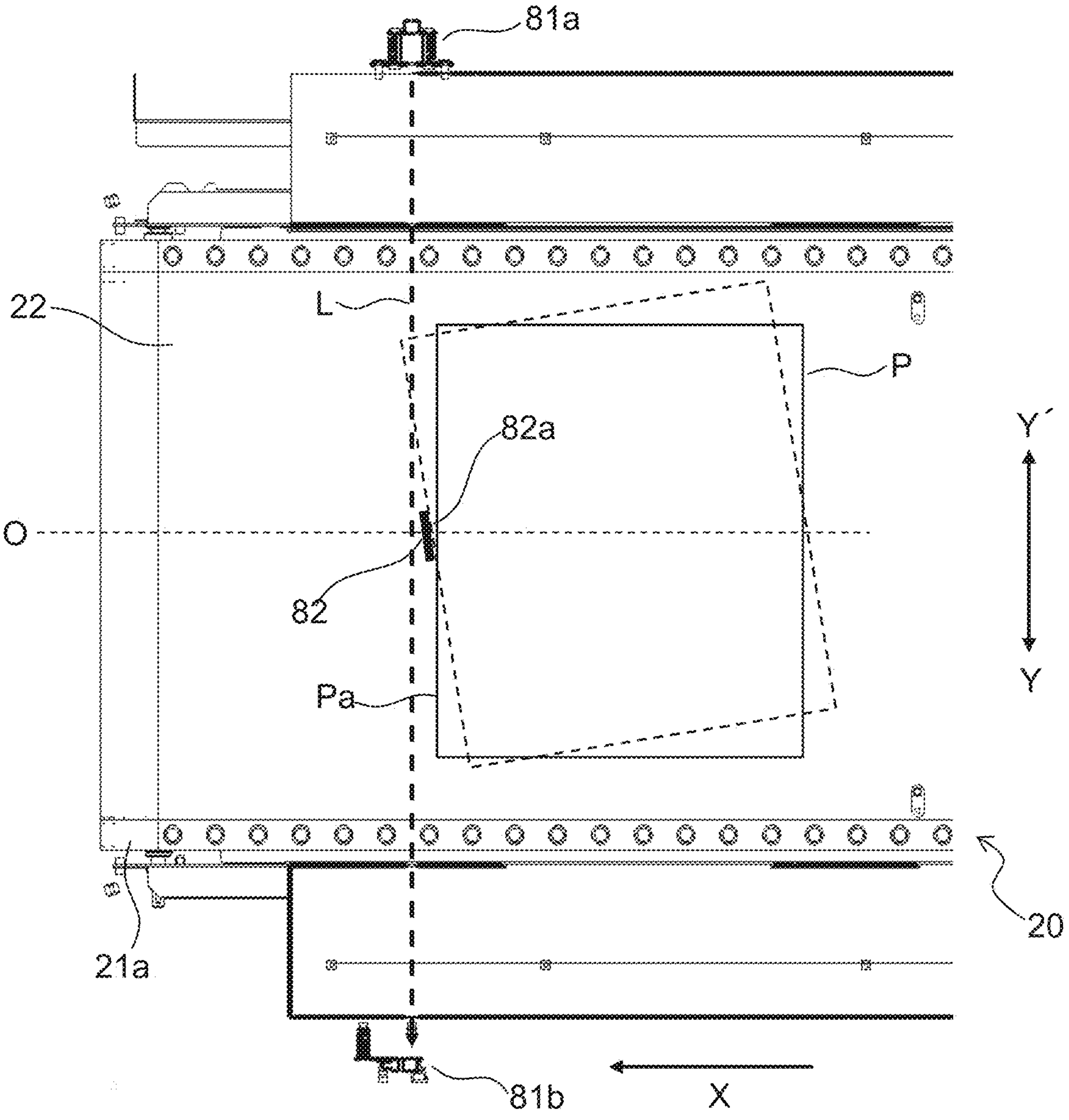
FIG. 11 is a plan view of the sheet lift sensing mechanism in the first conveyance portion, showing a modified example of a sensing assist member.

FIG. 11 is a diagram showing a modified example of the sensing assist member 82. The sensing assist member 82 shown in FIG. 11 has a guide surface 82*a* that is inclined at a predetermined angle with respect to the conveyance direction. When the downstream edge Pa of the sheet P in the conveyance direction collides with the guide surface 82*a*, as indicated by broken lines in FIG. 11, the edge Pa inclines, along the guide surface 82*a*, at the predetermined angle with respect to the conveyance direction.

Thus, as shown in FIG. 8, the bent part Pb of the sheet P blocks the optical path L between the light emitter 81*a* and the light receiver 81*b*. As a result, the sheet lift sensor 81 can reliably sense the lift of the sheet P. Moreover, since the sheet P inclines along the guide surface 82*a*, even if the sensing assist member 82 is arranged at a position overlapping with the width-direction center line O of the sheet P, the sheet P can be rotated along the guide surface 82*a*.

The above embodiment is not meant to limit the scope of the present disclosure, which can thus be implemented with any modifications made without departure from the spirit of the present disclosure. For example, while in the above embodiment the sensing assist member 82 is arranged closely upstream of the sheet lift sensor 81 with respect to the conveyance direction, the sensing assist member 82 can be arranged anywhere along the conveyance direction so long as it can contact the lifted part of the sheet P and rotate it.

However, if the sensing assist member 82 is arranged too far from the sheet lift sensor 81 in the conveyance direction, when the lifted part of the sheet P contacts the sensing assist member 82, it may fail to block the optical path of the sheet lift sensor 81. Thus it is preferable that the sensing assist member 82 be arranged within a predetermined range upstream or downstream of the sheet lift sensor 81 in the conveyance direction.

While the above embodiment deals with, as an example of the image forming system 200, a configuration where the sheet drying apparatus 10 is coupled to an inkjet printer as the image forming apparatus 100, needless to say, the sheet drying apparatus 10 can be used independently without being coupled to the image forming apparatus 100.

The present disclosure finds applications in sheet drying apparatuses that dry sheets having images printed on them by an inkjet recording apparatus or the like. Based on the present disclosure, it is possible to provide a sheet drying apparatus that can reliably sense a lift of a sheet with no contact of a sensing member with the top face of the sheet, and to provide an image forming system provided with such a sheet drying apparatus.

What is claimed is:

1. A sheet drying apparatus comprising:

a conveyance portion having a conveyance member that moves while holding a sheet having an image formed thereon with ink containing moisture;

a drying portion arranged opposite the conveyance member, the drying portion heating and drying the sheet; and a sheet lift sensing mechanism arranged downstream of the drying portion with respect to a conveyance direction of the sheet, the sheet lift sensing mechanism sensing a lift of the sheet from the conveyance member, wherein the sheet lift sensing mechanism includes:

a sheet lift sensor having a light emitter and a light receiver arranged opposite each other in a width direction of the sheet horizontally orthogonal to the conveyance direction; and a sensing assist member protruding from above into a conveyance space above the conveyance member, the sensing assist member contacting a lifted part of the sheet to rotate the sheet in a horizontal direction, and a distance from the conveyance member to the sensing assist member is smaller than a minimum height of the conveyance space.

2. The sheet drying apparatus according to claim 1, wherein the sensing assist member is arranged at a position displaced in the width direction from a center line, in the width direction, of the sheet conveyed by the conveyance member.

3. The sheet drying apparatus according to claim 1, wherein the sensing assist member has a guide surface inclined at a predetermined angle with respect to the conveyance direction.

4. The sheet drying apparatus according to claim 1, wherein the sensing assist member is arranged closely upstream of the sheet lift sensor with respect to the conveyance direction.

5. The sheet drying apparatus according to claim 1, wherein the drying portion has a heating unit movable up and down relative to the conveyance member, and the sensing assist member is fixed to a downstream end part of the heating unit with respect to the conveyance direction.

6. An image forming system comprising:

an image forming apparatus that forms an image on a sheet with ink containing moisture; and the sheet drying apparatus according to claim 1 coupled to the image forming apparatus at a downstream side thereof with respect to the conveyance direction of the sheet, the sheet drying apparatus drying the sheet having the image formed thereon by the image forming apparatus.

* * * * *